Sept. 28, 1948.   W. RISCH   2,450,383
METHOD AND MACHINE FOR PRODUCING PROPELLERS,
SHIPS' SCREWS, AND THE LIKE
Filed March 4, 1946   4 Sheets-Sheet 1

Inventor:
Werner Risch

By Watson, Cole, Grindle & Watson

Sept. 28, 1948. W. RISCH 2,450,383
METHOD AND MACHINE FOR PRODUCING PROPELLERS,
SHIPS' SCREWS, AND THE LIKE
Filed March 4, 1946 4 Sheets-Sheet 4

Inventor:
Werner Risch
By Watson, Cole, Grindle & Watson

Patented Sept. 28, 1948

2,450,383

UNITED STATES PATENT OFFICE 2,450,383

METHOD AND MACHINE FOR PRODUCING PROPELLERS, SHIPS' SCREWS, AND THE LIKE

Werner Risch, Zurich, Switzerland

Application March 4, 1946, Serial No. 651,768
In Switzerland November 14, 1945

16 Claims. (Cl. 51—100)

This invention relates to a method and a machine for producing propellers, particularly ships' screws, and the like, on the pressure and suction sides.

Processes for the treatment of ships' propellers are known by means whereof, using one pattern for the pressure side and another for the suction side, right and lefthanded blanks can be treated and by which the blank can be produced on an enlarged scale in comparison with the pattern.

The object of the present invention is to treat propellers, ships' screws and the like, of the same basic form but of any desired pitch and dimensions, by means of one and the same pattern.

According to the present invention, by varying the transmission of the relative movements in a radial, axial and tangential direction between the pattern and the tracer which taps off the pattern to the corresponding relative movements between the tool and the blank with the help of a single pattern representing the basic form of the blade of the propeller or screw, right and left-handed blanks of any desired pitch, any desired diameter, any desired width of blade and any desired thickness can be treated.

The machine for carrying out this process is characterised by the fact that the driving means for the production of the radial forward movement of the tracer and that for the radial forward movement of the tool are coupled to each other by a variable transmission and that the axial movement of the tracer can be transmitted by means of a system of rods with variable transmission to the tool while the pattern carrier and the blank carrier are coupled to each other in such a way that they can be moved to and fro in the same rhythm but with a mutually variable travel or stroke.

The pitch can be imparted to the blank to be treated independently of the pattern by varying the relative axial movement between the blank and the tool relatively to the rotary movement of the blank and the tool relatively to the rotary movement of the blank. The variation of this relative axial movement relatively to the rotary movement of the blank can take place gradually during treatment, so as to impart an increasing or a decreasing pitch to the blank in the direction of the radius.

The constructional forms of a machine for treating propellers according to the present invention are shown by way of example in the drawing.

Figs. 13 to 16 relate to the second constructional form of the machine in which the pitch of the surface of the propeller can be varied during treatment.

Figures 1, 5, 6:
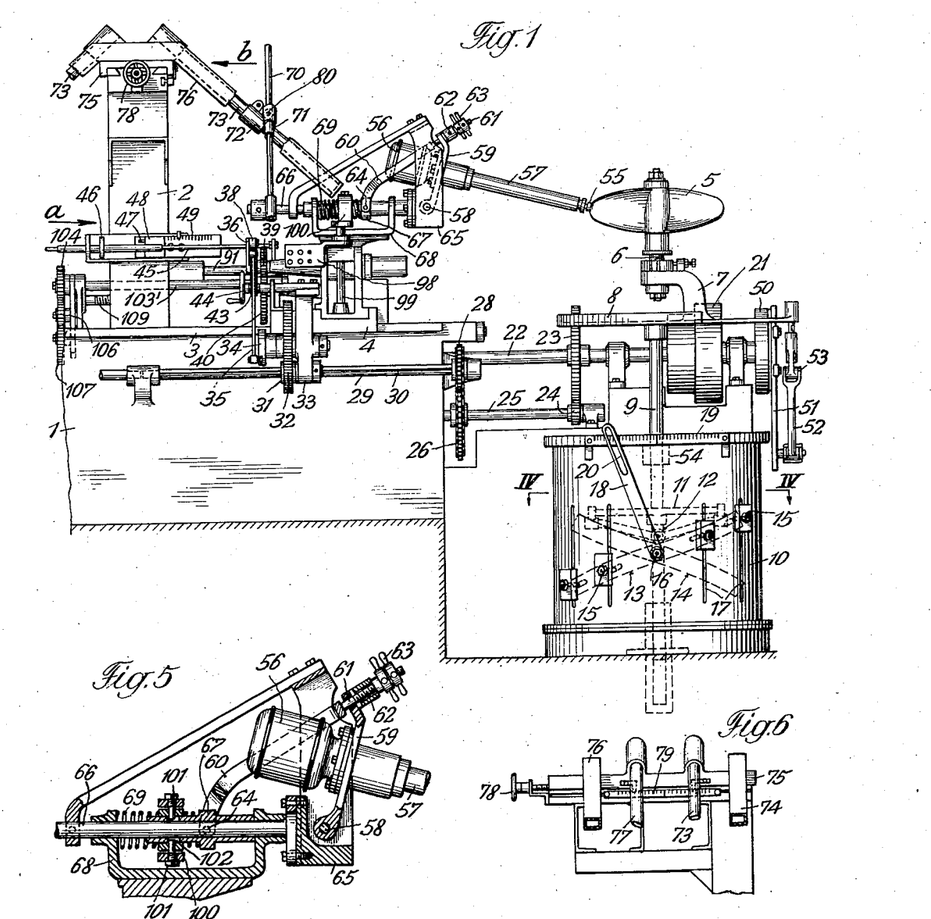
Fig. 1 is a partial view of the machine in elevation.
Fig. 5 is a vertical section through the tool support on a larger scale.
Fig. 6 is a partial view in the direction indicated by the arrow $b$ in Fig. 1.
Figures 2, 7, 8, 9, 10, 11, 12:
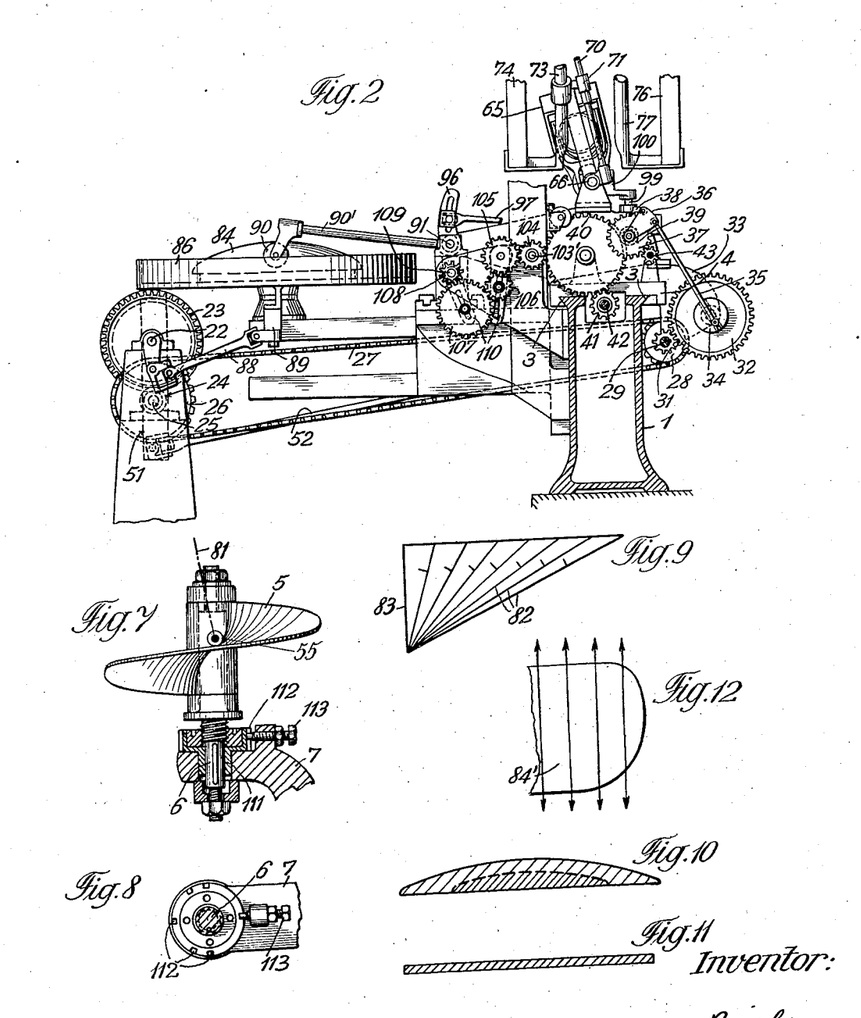
Fig. 2 is a view in the direction indicated by the arrow $a$ in Fig. 1.
Fig. 7 is a vertical section through the blank carrier.
Fig. 8 is a plan of the blank carrier.
Figs. 9, 10, 11 and 12 show diagrams which explain the way in which the machine works.
Figure 3:
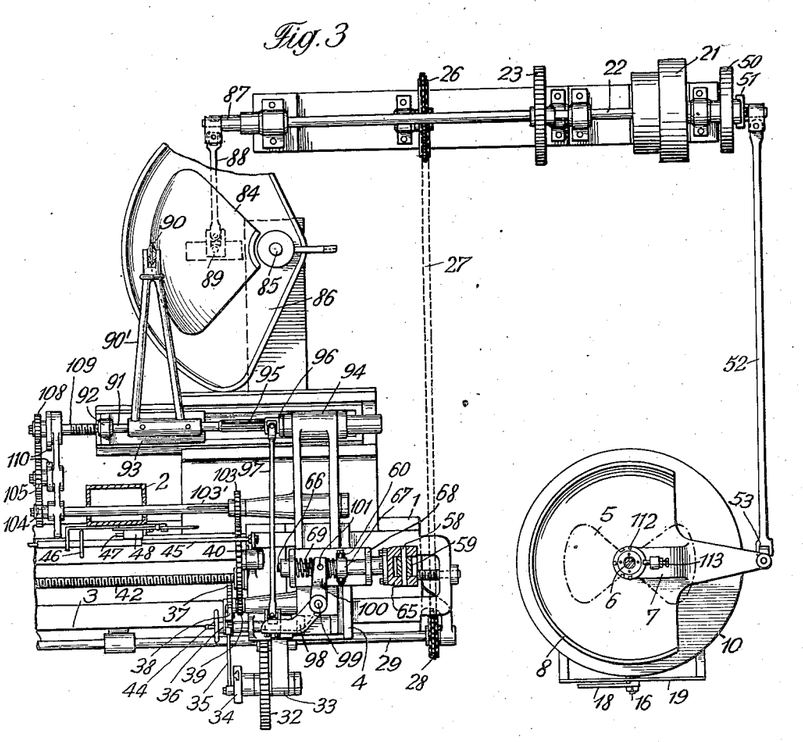
Fig. 3 is a plan of Fig. 2, partly shown in section.
Figure 4:
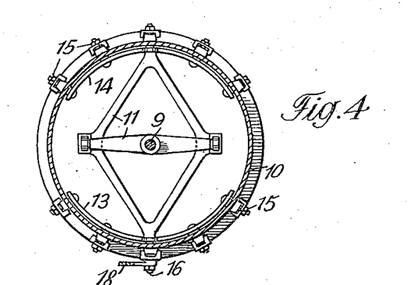
Fig. 4 is a section on the line IV—IV of Fig. 1.

As can be seen from Figs. 1, 2 and 3, the machine shown has a bed 1 with a fixed standard 2. On the bed of the machine is mounted a carriage 4, which carries the tool support and is movable along guides 3. The blank 5 is carried by a vertical spindle 6, which is journalled in a carrier arm 7, rigidly attached to a horizontal table 8. This table 8 is attached to the upper end of a vertical shaft 9, the lower end of which is carried in the interior of a cylindrical casing 10 by a frame 11 which has at diametrically opposite points rollers 12, which are adapted to run on rails 13 and 14 along the inner surface of the cylindrical wall of the casing 10. The said rails are of the same cylindrical curvature as the wall of the casing and are attached adjustably to the wall 10 by means of clamping screws 15, which are movable in vertical slots in the wall of the casing. Each of the two rails 13 and 14 can be connected at its centre to an adjusting screw, and, after the clamping screws have been loosened, the rails can be rotated about their central points 16 so as to vary their inclination or incline them in the opposite direction to that shown in Fig. 1. The desired degree of inclination can be read off on a scale 19 by means of a slot 20 cut in the adjusting lever 18 and acting as a recording mark.

The machine is driven by a stepped pulley 21, which is in connection with a driving motor (not shown). The driving shaft 22 transmits the movement through a pair of gear wheels 23, 24 to the shaft 25, on which a chain wheel 26 is mounted, which is connected by a chain 27 to the chain wheel 28 mounted on a shaft 29. This shaft 29 has a keyway 30 cut in it which extends over its whole length and carries a gear wheel 31 which is in engagement with the keyway and therefore rotates with the shaft but can travel along it as it is connected to the carriage 4 by an arm 33 on this latter for the purpose of axial movement. The wheel 31 gears into a wheel 32, which is likewise carried by the arm 33 of the carriage 4. The shaft of the wheel 32 carries a disc crank 34, the crank pin of which acts by means of a connecting rod 35, on a pawl carrying arm 36, which carries a feed pawl 38, which cooperates with the teeth of the wheel 37. This wheel 37 is connected by a pinion 39 to a wheel 40 which gears into the ring of teeth on a screw-threaded nut 41, which is mounted on the guide spindle 42 and is also connected to the carriage 4. At each revolution of the disc crank 34, a rotary movement will consequently be imparted to the screw-threaded nut whereby the carriage 4 will be intermittently moved onwards so as to impart the forward movement to the tool. Into the wheel 37 gears a pinion 43, on the shaft of which a handwheel 44 is mounted by means whereof the wheels 37, 39 and 40 can be rotated by hand, for the purpose of adjusting the tool by hand or for bringing back the carriage 4 into its original position.

For the purpose of automatically interrupting the feed movement after a predetermined length of stroke, an arrangement for interrupting the circuit of the driving motor is provided. This arrangement has a rod 45 which cooperates with the carriage 4 and has a stop disc 46, which, at the end of the desired feed movement strikes against a movable contact carrier 47 of a switch 48, whereby the circuit of the driving motor is broken. The switch 48 can be pushed along a scale 49 so as to enable the desired length of the feed movement to be adjusted.

On the driving shaft 22 is mounted a disc crank 50 to which a longitudinally adjustable crank arm 51 is attached. To this crank arm 51 is pivoted one end of a connecting rod 52, the other end of which is connected by means of a universal joint 53 to the blank table 8. When the driving shaft 22 rotates a to-and-fro oscillating motion will be transmitted through the cranks 50, 51 and the connecting rod 52 to the table 8, the amplitude of which is adjustable by varying the length of the crank arm 51. The vertical shaft 9 and the carrier frame 11 also oscillate to and fro with the table 8, the rollers 12 travelling along over the inclined rails 13 and 14. These rails impart an up-and-down movement to the table 8 in addition to the to-and-fro oscillating movement about the axis of the shaft 9, this latter being guided in the bearing 54 in the casing 10. The arm 7, the shaft 6 and the blank 5 attached to it, also move with the table 8. Each point on the blank moves therefore up and down along a helical line.

The rotating, grinding or milling tool 55 acting on the surface of the propeller is driven by a motor 56 which is connected to the tool 55 by a shaft carried in bearings in the interior of the carrier sleeve 57. The motor 55 with the carrier sleeve 57 is connected to a carrier arm 59 adapted to oscillate about the axis 58. The inclination of the carrier arm 57, and therefore that of the axis of the tool, can be adjusted by hand, a rod 60 which projects through an opening in the upper end of the carrier arm 59 and has a screw thread on its end 61, on which screw-threaded nuts 63 bearing against a sleeve 62 on the arm 59 permitting of this, rotate. The rod 60 is pivotally attached to a sleeve 67 on a horizontal shaft 66 at an axis 64, and by rotating the nuts 63, the upper end of the arm 59 will be advanced along the rod 60 in one direction or the other, whereby the inclination of the carrier sleeve 57 of the tool 55 will be varied and the tool can make a restricted movement in a vertical direction.

The shaft 58 of the carrier arm 59 is mounted in bearings in a frame 65, which is attached to a horizontal shaft 66. This shaft carries the longitudinally movable sleeve 67, to which the arm 60 is pivotally connected at 64. The shaft 66 is journalled in a frame 68, which is carried by the carriage 4. A spring 69 bears against the frame 68 and acts on the sleeve 67 so as to keep it constantly in contact with the right side of the frame 68, which acts as a stop or abutment. To the shaft 66 is connected a rod 70 which lies in a plane situated at right angles to the shaft 66 and is guided and moves longitudinally in a sleeve 71 which is rigidly connected to another sleeve 72. The sleeve 72 is movable longitudinally on a rod 73 which is inclined relatively to the horizontal. The vertical plane passing through the said rod 73 is parallel with the horizontal shaft 66 and with the direction of movement of the carriage 4. Said rod 73 is attached by its lower end to a carrier arm 74, while its upper end and that of the carrier arm are rigidly connected to a transverse carriage 75 on the upper end of the standard 2. To the carriage are attached a second carrier arm 76 and a second rod 77, this latter being parallel with the rod 73 and situated at a lateral distance therefrom, in such a way that the horizontal shaft 66 lies between the two vertical planes passing through the rods 73 and 77, as shown in Fig. 2. The carriage 75 can be adjusted by means of a handwheel 78 transversely to the direction of movement of the carriage 4 and a scale 79 permits of the adjustment of one or other rod 73 or 77 to a predetermined distance from the vertical plane passing through the horizontal shaft 66.

When the carriage 4 makes its advance movement from right to left in Fig. 1, the frame 68 together with the horizontal shaft 66, the frame 65 and the tool 55 move likewise towards the right. The rod 73 remains stationary, while the rod 70 participates in the movement of the horizontal shaft towards the right. The sleeve 71 mounted on the rod 70 and which is carried by the sleeve 72 on the rod 73, likewise exerts a tractive action on the sleeve 72 towards the right, so that the sleeve 72 is compelled to slide downwards on the rod 73. The more the sleeve 72 slides downwards, the less will be its distance away from the rod 66 in a vertical direction. The sleeve 71 slides therefore downwards on the rod 70, and, as it does so, rocks the rod 70 in a counter-clockwise direction in Fig. 2, that is to say, in a vertical direction with respect to the shaft 66. This rocking of the rod 70 is rendered possible inasmuch as the sleeve 72 can rotate about the axis of the rod 73, while the sleeve 71 can rock about an axis 80 relatively to the sleeve 72. The more, therefore, the carriage 4 is pushed downwards towards the right, the lower does the sleeve 72 slide downwards along the rod 70 and the more does the rod 70 rock in a counter-clockwise direction in Fig. 2. The rocking of the rod 70 causes the rotation of the horizontal shaft 66 about its axis, and, consequently, a corresponding rocking of the frame 65 rigidly connected to the shaft 66, also of the motor 56 and the carrier sleeve 57 of the tool. The tool 55 itself lies in the extension of the axis of the shaft 66 and therefore remains on the spot when the frame 65 and the carrier sleeve 57 are rocked, only the position of the axis of the tool with respect to the blank being varied by this rocking.

As shown in Fig. 7, the tool 55 will be so adjusted when the treatment of the abutting surface of the propeller is commenced that the axis of the tool lies in a plane 81 which is situated at right angles to the plane which is tangential to the surface of the propeller on which the tool is active. When the tool is in this position, the most favourable cutting angle for accurate treatment of the surface of the propeller is obtained. Since this tangential plane becomes more and more steep, the smaller the radius of the surface of the screw becomes, as is shown diagrammatically in Fig. 9, where the lines 82 show the planes tangential to the surface of a propeller at various radial distances from the axis 83 thereof, the cutting angle of the tool would, as the forward movement proceeds, become unfavourable if the above-described arrangement for the rotation of the horizontal shaft 66 and the corresponding rocking of the axis of the tool were not present, by means of which arrangement the axis of the tool can be continuously adjusted during the forward movement in such a way that it remains in a plane which is at right angles to the tangential plane. The scale 79 permits of the adjustment of the transverse carriage 75, which carries the rod 73 so that at the commencement of the treatment of the propeller blade the axis of the tool assumes the desired position with respect to the surface of the propeller.

The oblique position of the tool frame 65, shown in Fig. 2, is necessary for the treatment of right-handed propeller surfaces. In the case of left-handed propeller surfaces, the inclination of the frame 65 relatively to the vertical plane passing through the shaft 66 must be the opposite of the inclination shown. In this case the rod 70 is released by the sleeves 71 and 72 and connected to similar sleeves on the rod 77, the connection of the rod 70 to the rod 77 and to the shaft 66 being of the same kind as the connection of the rods 73 to the shaft 66, but with opposite inclination of the rod 70.

The rear or suction side of the surface of the propeller is usually not constructed as a helical surface but as a convex arched surface, as shown in section in Fig. 10. The treatment of this suction side takes place for all sizes of propellers with the use of a single pattern 84, which is mounted in an oil bath on a pattern table 86 adapted to rotate about a vertical axis 85. The said table 86 is driven from the main driving shaft 22 by a crank 87 and a connecting rod 88, which is attached to an arm 89 which hangs down from the table 86. When the shaft 22 rotates, the table 86 therefore makes a to-and-fro rocking movement about the axis of rotation 85, in the same rhythm as that in which the blank table 8 rocks about the axis of the shaft 9.

The pattern 84 is tapped off by a tracer roller 90, which is carried by an arm 90[1], which is rigidly connected to a shaft 91. This shaft 91 is mounted at one end in a bearing 92 on a carriage 93 and at the other end in a bearing 94 connected to the carriage 4 in such a way that it can rotate and also move longitudinally. On a part 95 of the shaft 91, which is provided with a longitudinal groove, is mounted a sliding slotted link 96. This sliding slotted link and the bearing 94 participate in the movement of the carriage 4. In the said sliding slotted link 96 is adjustably fixed one end of a connecting rod 97, the other end of which is connected to a lever arm 98, which is mounted fast on a vertical shaft 99. This vertical shaft 99 carries also another lever arm 100 which has a forked end, which embraces the sleeve 67 on the horizontal shaft 66 and engages by means of pins 101 in openings 102 in the sleeve 67.

When the pattern table 86 rocks to and fro, the arched upper surface of the pattern 84 is tapped off by the tracer roller 90 over the arc of a circle. The movements made by the tracer roller in the vertical plane are thus transmitted by the arm 90[1] to the shaft 91, which is rotated to correspond to the deflection of the arm. The sliding slotted link 96 participates in the movements of the shaft 91 and the connecting rod 97 transmits the movements to the lever arm 98, which operates the lever arm 100 through the shaft 99. The pins 101 on the lever arm which engage in the sleeve 67 (see Fig. 5) push the sleeve, during the rising movement of the tracer roller 90, over the pattern 84 to the left on the horizontal shaft 66 and the rod 60, pivotally attached to the sleeve, participates in this movement and rocks at the same time the arm 59 carrying the tool 55 about its axis of rotation 58. The tool 55 therefore makes an upward movement corresponding to the upward movement of the guide roller 90, and when the roller moves from the highest point of the pattern downwards towards its edge, the lever arm 100 will be moved to the right again and will push the sleeve 67 towards the right with the result that the tool will be lowered.

The extent of the deflection or travel of the tool vertically can be varied as may be desired by varying the transmission factor of the movement transmitting elements between the guide roller 90 and the tool 55. By adjusting the connecting rod 97 in the sliding slotted link 96 and by varying the position of the point of attachment of the rod 97 on the lever arm 98, the magnitude or extent of the upward and downward movement of the tool 55 can be adjusted to correspond to the desired thickness of the propeller blade, so that the same pattern 84 can be used for the treatment of blanks with different thicknesses of blade.

The wheel 40, which transmits the forward movement to the carriage 4, is connected by means of a wheel 103, a shaft 103[1], and a countershaft 104, 105, 106 and 107, to a wheel 108, which is adapted to rotate a screw 109, which is screwed into a nut carried by the carriage 93. At each step-by-step advance of the wheel 40, the wheel 108 will also be rotated one step and the screw 109 will produce a forward movement of the carriage 93 with the shaft 91 and the tracer arm 90[1] towards the right. The pattern table 86 and the blank table 8 rock in the same rhythm to and fro, but the amplitude of the two tables may be different. While, therefore, the tracer roller 90 taps off the pattern 84 over the arc of a circle from one side to the other, the blade of the blank 5 to be treated (see Fig. 3) will be moved over its whole width past the tool.

In order, therefore, to be able to treat propellers, of different diameters with the same pattern 84, the wheels 105, 106, 107 are mounted interchangeably in sliding slotted links 110, so that the translation of the transmission of movement from the wheel 40 to the screw 109 can be varied as may be desired and the carriage 93 can be fed forward at the same speed as the carriage 4, or more quickly or more slowly in a forward direction. If the diameter of the blades of the propeller to be treated is the same as that of the pattern 84, then the forward speeds of the two carriages 4 and 93 must be equally great, so that the tool and the tracer roller 90 can pass over the same radial distance in the same time. If the radius of the blank is smaller than that of the pattern 84, as is the case in Fig. 3, the carriage 93 must be moved forward by a larger amount than the tool, so that the tracer roller 90 and the tool reach the inner end of the pattern and of the blade blank simultaneously. A blade of greater radius than that of the pattern can also be treated, in which case the guide roller 90 must be moved forward by a smaller amount than the tool.

By means of the same pattern 84, propeller blades of the same, greater or lesser width than those of the pattern can be treated, in that by means of the adjustable crank arm 51 the amplitude of the oscillating movement of the blank about the axis of the shaft 9 compared with that of the pattern about the axis 85, can be varied, the blank and the pattern oscillating notwithstanding continuously in the same rhythm but at a different angular velocity, so that the relative path of the tool compared with that of the guide roller 90 becomes longer or shorter. By means of one and the same pattern 84, therefore, propellers of the same kind of profile or contour and with different diameters, widths, thicknesses and pitches of blade and also right and left-handed propellers can be treated on their backs.

The driving gear of the pattern table 86 can be thrown out of action, for example, by disconnecting the connecting rod 88. In this case, the whole width of the pattern 84 will not be tapped off; on the contrary, the tracer roller 90 will be moved onwards along a radial line while the pattern remains stationary, so that the thickness of the blade treated remains the same over its whole width, as shown by way of example in Fig. 10. This method of treatment may be adopted for large blades, the edges of which blades being rounded off afterwards.

The shaft 6 is arranged to take blanks with two or four blades. It is inserted in the carrier arm 7, a sleeve 111 being interposed between it and the arm, and the said sleeve is provided on its outer surface with grooves 112, in which a set screw 113 on the arm 7 engages. Said grooves 112 are arranged at such an angular distance from each other that the sleeve can be rotated through angles of 90°, 120° or 180° and locked again by the set screw for the purpose of fixing four, three or two bladed propeller blanks in the working position.

Instead of allowing the pattern table to make an oscillating movement about an axis, this table may also be moved to and fro in a straight line, so that the pattern $84^1$ (see Fig. 11) is tapped off by the tracer roller along straight lines.

To treat a propeller, the cast rough blank is first treated on its abutting surface being chucked on the shaft 6 of the blank carrier with the abutting surface uppermost in such a way that the centre of one of the blades of the propeller is located, when the table 8 is in the central position shown in Fig. 3, in the prolongation of the axis of the horizontal shaft 66 of the tool carrier. By working the carrier 4 by hand, the tool 55 is then brought into the working position on the outer edge of the blade. The guide rails 13 and 14 for the movement of the blank table 8 are adjusted to the oblique position corresponding to the pitch of the propeller and the transverse carriage 75 is adjusted in such a way that the plane 81 (see Fig. 7) passes through the axis of the tool and the radius of the blade and along which the tool makes its forward movement, is situated at right angles to the plane, which is tangential to the abutting surface of the propeller blade at its outer edge at which treatment begins. The driving connection of the main driving shaft 22 with the pattern table 86 is interrupted and also the driving connection of the wheel 40 with the carriage 93 of the guide roller 90, as the treatment of the abutting surface of the propeller takes place without the help of a pattern. The driving gear of the machine is then switched on and also the motor which drives the tool 55, and the blank table with the blank 5 on it begins to make its oscillating movement about the axis of the shaft 9, connected with the up-and-down movements of the axis 9, while the forward movement of the tool is obtained by intermittently switching in the wheel 37. Each point of the blank is in this way brought past the comparatively stationary tool along a helical line, and the entire surface of the blade will be treated automatically as an accurate helical surface without the need for a pattern. During the forward movement the horizontal shaft 66 will, as has been already described above, be slowly rotated by the rod 70 sliding down along the rod 73 or 77 so as to keep the axis of the tool constantly in the normal plane to the tangential plane in accordance with the increasing inclination of the tangential plane relatively to the surface of the propeller as the radial distance away of the tool becomes smaller.

When the tool reaches the hub of the blank, the stopping device 45, 46, 47 comes into action and stops the main driving motor. The blank is then adjusted for the treatment of the next blade by rotating the sleeve 111 through the angle corresponding to the number of blades and the treatment of the second blade takes place as before, the tool being again adjusted to the outer edge of the second blade and after starting the machine again the blade is treated automatically.

When all the blades of the propeller have been treated on the pressure side, the blank is chucked in the reverse position on the shaft 6 so as to enable the suction side of the blades to be treated. The pattern table 86 is now likewise connected to the main driving shaft 22 and the carriage 93 of the tracer roller 90 is connected to the wheel 40 by means of a countershaft 105, 106, 107 of suitable translation ratio to correspond to the relationship of the radius of the propeller blade to the radius of the pattern 84. The crank arm 51 is adjusted to correspond to the pattern and the translation of the transmission of movement from the carrier arm $90^1$ of the tracer roller to the tool is adjusted to correspond to the thickness of the blade. The treatment of the back of the blade then takes place in the same way as that of the abutting or front side. When the main driving shaft 22 is switched on the blank table 8 and the pattern table 86 oscillates in the same rhythm and the tool will again be automatically moved forwards over the whole of the radial length of the blade. Since the back of the blade is arched and no longer forms a helical surface, the axis of the tool is still only located on the central radius of the blade in the normal plane to the tangential plane at the surface of the blade at the point where the tool touches, while on both sides of the blade the tool, owing to the curvature of the surface of the blade no longer works at the most favourable cutting angle which however is hardly any disadvantage in practice so far as the treatment of the back of the blade is concerned.

In Figure 1 only one half of the machine shown as an example is depicted. On the left hand side of the standard 2 the machine has the same arrangements over again, as it has on the right hand side of the standard that is to say a carriage 4 with a tool carrier and a casing 10 with a blank table. The shaft 29 which runs the whole length of the machine bed 1 also produces the forward movement of the second carriage (not shown) together with the tool carrier, the transverse carriage 75 on the standard 2 carries a second pair of rods 73 and 77 for the production of the oscillating movement of the shaft of the second tool (not shown). On the other hand the machine has only one single pattern table 86 and a single pattern 84 and the tracer roller 90 controls only the tool 55 shown on the right hand side. In this machine therefore it is mainly the front side of the propeller which is treated on the left hand side while on the right hand side of the machine it is mainly the back of the blank which is treated. In this way two blanks can be operated on simultaneously, one on the pressure side and the other on the suction side.

In the constructional form shown in Figures 13 to 16, 5 denotes again the blank, which as shown in Figures 7 and 8 is chucked firmly on a vertical shaft with the interposition between it and the shaft of an adjusting sleeve 111. The shaft 114 of the blank table is mounted in roller bearings 115 on a vertical carriage 116. This carriage 116 is guided vertically in a standard 117 which is rigidly connected to the bed 118 of the machine. The bed of the machine carries a longitudinally movable carriage 119, which is guided by means of rollers 120 and 121 on rails 122 and 123 on the bed of the machine. Rigidly connected to the carriage 119 are two frames 124 and 125 in each of which a vertical screw 126 and 127 is mounted to rotate. On each screw there is screw-threaded nut 128 and 129 respectively which can be adjusted upwards and downwards. Each of the two nuts carries a pin 130 and 131 respectively and each of these pins engages in a slot 132 in the ends of a beam 133 which forms a guideway 133¹ for a roller 134 the shaft of which is carried by the vertical carriage 116. On the upper end of the two screws 126 and 127 is keyed a worm wheel 135 and 136 each of which worm wheels gears into a worm 137 and 138 respectively. The two worms are mounted on a shaft 139 the part 140 of which, provided with longitudinal grooves, is mounted to move longitudinally in a sleeve 141 but can rotate with said sleeve. On this sleeve 141 is keyed a hand wheel 142 by means of which the sleeve 141 can be rotated and also a ratchet wheel 143, with which a driving pawl or feed pawl 144 co-operates. This pawl 144 can, like the pawl 36, 38 in Figure 2, be moved to and fro by the disc crank 34.

The carriage 119 is moved longitudinally by a screw 145 which engages in a nut 146 rigidly attached to the carriage. The screw 145 is rotated by a driving worm 147 which is driven by a worm wheel 148. The worm 147 is preferably driven by a reversible electromotor, which is not shown, and is reversed in the well known way each time the carriage reaches the end of the travel of its to and fro movement.

The to and fro movement of the carriage 119 is accompanied by the to and fro movement also of the frames 124 and 125 together with the screw spindles 126 and 127 which carry the beam 133. When the carriage moves towards the left as in Fig. 13, the guideway 133¹, when it assumes the position shown, presses against the roller 134, and the vertical carriage 116, which carries the shaft 114 of the blank table 8, will be moved upwards together with the shaft 114 and the table 8 in the vertical guides of the standard 117. On the movement of the carriage 119 towards the right, the guideway 133¹ will likewise be moved to the right together with the carriage, and the vertical 116 will slide downwards by the action of its own weight, the roller 134 meanwhile travelling over the guideway 133.

In order to produce the synchronous rotation of the blank with the upward and downward movement of the blank shaft, the vertical carriage 116 is provided with an arm 149, which carries in guides 150 a horizontal carriage 151. This carriage 151 carries two rollers 152 which are in contact with a vertical guiderail 153 attached to the carriage 119. Two steel bends 154 and 155 are passed in opposite directions to each other round the edge of the blank table 8 and attached thereto by one of their ends, while the other end of the band 154 is attached at 156 to the horizontal carriage 151, and the other end of the band 155 at 157 to the horizontal carriage 151.

Figure 13:
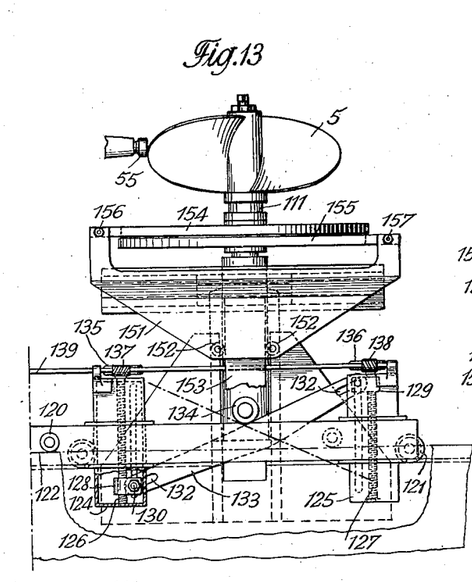
Fig. 13 is a partial view of this constructional form and shows in elevation the arrangement for producing the vertical adjustment of the tool carrier in the direction of the axis of the tool.
Figure 14:
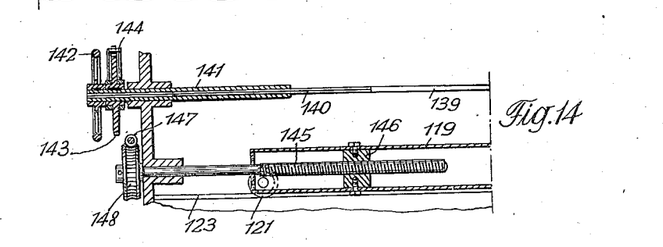
Fig. 14 is a partial view of the arrangement which joins on to the left-hand side of Fig. 13.
Figure 15:
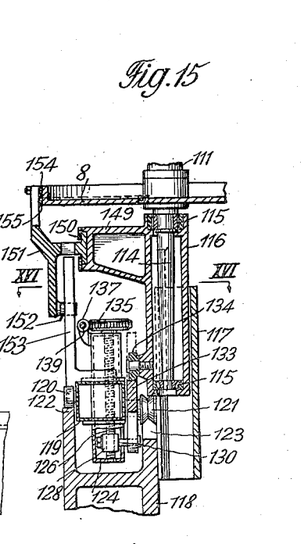
Fig. 15 is a vertical section through the axis of the blank.
Figure 16:
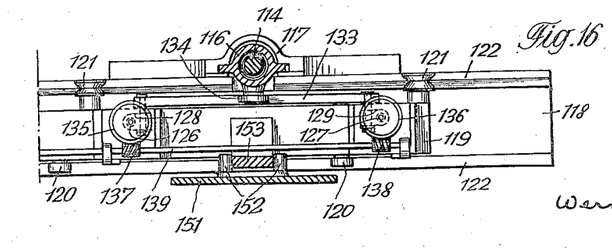
Fig. 16 is a plan of the arrangement with a horizontal section on the line XVI—XVI of Fig. 15.

When the carriage 119 moves towards the left in Fig. 13 and the guideway 133¹ pushes the vertical carriage 116 upwards, the horizontal carriage 151 will also be carried upwards by the arm 149 of the vertical carriage 116 and the height to which it is carried with respect to the blank table 8 remains unchanged. The vertical guide rail 153, however, also moves with the carriage 119 and acts on the corresponding roller 152 of the horizontal carriage 151, which consequently is pushed towards the left during its upward movement, the rollers 152 sliding upwards along the guide rail 153. When the horizontal carriage 151 is pushed towards the left it exerts a pull on the steel band 154, which pull causes the blank table to be rotated, while the second steel band rolls round the table. When the carriage 119 moves towards the right, the vertical carriage 116 descends together with the horizontal carriage 151, while the guide rail 153 runs towards the right with the carriage 119 and the horizontal carriage 151 likewise is pushed towards the right, the steel band 155 rotating the blank table 8 in the opposite direction and the steel band 154 rolling round the periphery of the table.

The tool 55 works as in the example previously inscribed and is advanced one step in a radial direction after each to-and-fro movement of the blank table 8. With the help of the shaft 139, which is adapted to rotate the screws 126, 127 by means of the worms 137, 138 and the worm wheels 135, 136, it is possible to adjust the pitch of the propeller blade to be treated in any desired manner, while the oblique position of the guideway 133¹ can be varied by adjustment of the screw-threaded nuts 128 and 129. The guideway can be adjusted obliquely outwards from the horizontal position in both directions either into the oblique position illustrated by solid lines in Fig. 13 or into the oblique position indicated by dot and dash lines. Right and left-handed screw surfaces can therefore be operated on by means of the same apparatus.

With the help of the ratchet wheel 143 and the pawl 144, it is possible to vary the pitch of the treated propeller blades in the direction of the radius during the treatment of them, that is to say, in the direction towards the hub the pitch gradually becomes greater or smaller. Since the ratchet wheel 143 is thrown out of action after each to-and-fro movement of the carriage 119, by the disc crank 134 in one direction or the other, the shaft 119 will be rotated correspondingly and the guideway 133¹ will be gradually adjusted more steeply or flatter so that the pitch of the propeller blade under treatment will diverge from the constant in a radial direction.

The width of the blade under treatment will also be determined by the amplitude of the to-and-fro movement of the carriage 119 as the longitudinal movement of the horizontal carriage 151 and therefore the magnitude of the rotation of the table 8 depend on the travel or path of the carriage.

It is, of course, to be understood, that the above described structure is merely illustrative and in no wise limiting, and I desire to comprehend within my invention all modifications included within the scope of the appended claims.

I claim:

1. In a propeller milling and grinding machine, a pattern carrier, a tool carrier, mounted for radial relative movement with respect to a work piece, a tool carried by said tool carrier, a movable tracer adapted to tap off a pattern carried by said pattern carrier, said tracer mounted for axial and radial movement with respect to said pattern carrier, driving mechanism for the radial movement of the tracer, driving mechanism for the radial movement of the tool, means for coupling said two driving mechanisms with variable translation, means for axially moving the tool, a system of movement transmitting elements between the tracer and the tool for transmitting the axial movement of the tracer with variable translation to the tool, a propeller blank carrier, means for imparting a to-and-fro movement to the pattern carrier, means for imparting a to-and-fro movement to the propeller blank carrier, and coupling means between the drive for the pattern carrier and the drive for the propeller blank carrier for moving the two carriers at the same rhythm but with mutually variable stroke.

2. In a propeller milling and grinding machine, a rotatable pattern carrier, a rotatable propeller blank carrier, driving means for imparting a rocking movement to the pattern carrier about the axis of the pattern, driving means for imparting a rocking movement to the propeller blank carrier about the axis of the blank, means for imparting a straight line to-and-fro movement parallel with the axis of the blank to the blank carrier simultaneously with imparting said rocking movement to the blank carrier, and coupling means between the blank carrier and the pattern carrier for producing the rocking movement of the two carriers at the same rhythm but with mutually variable stroke.

3. A propeller milling and grinding machine as defined in claim 2, comprising a guide way supporting said blank carrier, said guide way extending at an angle relatively to the axis of the blank.

4. A propeller milling and grinding machine as claimed in claim 2, comprising a helical guide way supporting said blank carrier, and means for adjusting the pitch of said helical guide way.

5. In a propeller milling and grinding machine, a pattern carrier, means for imparting a rocking movement to the pattern carrier about the axis of the pattern, an axially and radially movable tracer adapted to tap off the pattern, an axially and radially movable tool, means for transmitting the movement of the tracer to the tool with variable translation, a propeller blank carrier, a guideway supporting said blank carrier, said guideway being inclined relatively to the blank axis, a carriage supporting said guideway and adapted to effect a to-and-fro movement at right angles to the axis of the blank whereby the blank carrier is moved to-and-fro in the direction of the axis upon movement of said carriage, and means connecting said carriage with said blank carrier to impart a rocking movement to the blank carrier about the axis of the blank upon movement of said carriage.

6. A propeller milling and grinding machine as claimed in claim 5, wherein screw shafts are connected to both ends of the guide way to displace said ends and thereby vary the inclination of the guide way upon rotation of said screw shafts.

7. In a propeller milling and grinding machine, a propeller blank carrier arranged for rotation about the axis of the blank and for straight to-and-fro movement in the direction of said axis, a carriage adapted to move to-and-fro at right angles with respect to the axis of the blank, a guide way on said carriage disposed at an angle relatively to the axis of the blank, said guide way supporting the propeller blank carrier whereby said carrier is moved to-and-fro in the direction of the blank axis upon movement of said guide way with the carriage, two screw nuts carrying each one end of said guide way, two screw shafts carried by the carriage and engaging each one of said screw nuts, a common control shaft operatively connected to each of said screw shafts and adapted to impart equal movements of rotation to said shafts whereby to displace the ends of the guide way carried by said nuts to vary the angular position of the guide way relatively to the axis of the blank, a hand wheel for actuating said common control shaft, and a step by step feed mechanism connected to said control shaft to intermittently rotate the shaft so as to gradually vary the inclination of said guide way.

8. In a propeller milling and grinding machine, a pattern carrier, means for imparting a rocking movement to the pattern carrier about the axis of the pattern, a tracer movable axially and radially relatively to the pattern for tapping off the pattern, a propeller blank carrier arranged for effecting a rocking movement about the axis of the blank simultaneously with a to-and-fro movement in the direction of said axis, coupling means between said pattern carrier and said propeller blank carrier to have the two carriers effect the rocking movement at the same rhythm, a tool carrier adapted to effect a forward movement radially to the axis of the blank, the axis of the tool being inclined relatively to the radius of the blank along which the tool works, the tool carrier being arranged to be rocked about an axis extending in the direction of said radius, means for operatively connecting said tracer to the tool carrier to transmit the axial movements of the tracer to the tool carrier, and means for varying the ratio of transmission between the tracer and the tool support.

9. In a propeller milling and grinding machine, a pattern carrier, means for imparting a to-and-fro movement to the pattern carrier, a tracer movable axially and radially relatively to the pattern for tapping off the pattern, a propeller blank carrier arranged for effecting a rocking movement about the axis of the blank simultaneously with a to-and-fro movement in the direction of said axis, a tool carrier, a feed carriage adapted to move radially with respect to the blank towards the hub thereof, a rotatable shaft on the carriage having the tool carrier mounted thereon and directed radially with respect to the blank, the axis of the tool being inclined relatively to radius of the blank along which the tool works, and control apparatus operatively connected to said rotatable shaft to gradually turn said shaft upon advance of the feed carriage towards the hub of the blank and rock the tool carrier about the axis of said radially directed shaft.

10. A propeller milling and grinding machine as defined in claim 9, wherein the axis of the tool is situated in a plane extending substantially at right angles to a plane which is tangential to the surface of the blank on the radius along which the tool works, and said control apparatus is adapted to produce a gradual rocking movement of the tool carrier about said radially directed shaft to continuously maintain the tool axis in the plane extending perpendicularly to said tangential plane upon advance of the feed carriage, in accordance with the increasing inclination of the surface of the blank towards the hub thereof.

11. A propeller milling and grinding machine as defined in claim 9, wherein said control apparatus comprises a guide member situated obliquely to the rotatable shaft supporting the tool carrier, and a lever having one end fixed to said shaft and the other end slidingly engaged on said oblique guide member, so as to gradually rotate said shaft upon the feed carriage advances towards the hub of the blank.

12. A propeller milling and grinding machine as defined in claim 9, wherein said control apparatus comprises two guide members situated obliquely to the rotatable shaft supporting the tool carrier and in planes parallel with said shaft at opposite sides thereof, and a lever having one end fixed to said shaft and the other end slidingly engaged on one or the other of said oblique guide members, of which guide members one controls the rocking movement of the tool carrier when right-handed blanks are being treated, and the other guide member controls the rocking movement of the tool carrier when left-handed blanks are being treated.

13. A propeller milling and grinding machine as defined in claim 9, wherein said control apparatus comprises a carriage movable transversely to the movement of said feed carriage, two guide members fixed on said carriage, said guide members being situated obliquely to the rotatable shaft supporting the tool carrier and in planes parallel with said shaft at opposite sides thereof, a lever having one end fixed to said shaft and the other end slidingly engaged on one of the other of said oblique guide members, of which guide members one controls the rocking movement of the tool carrier when righthanded blanks are being treated, and the other guide member controls the rocking movement of the tool carrier when lefthanded blanks are being treated, and means for moving said carriage supporting the guide members transversely relative to the rotatable shaft supporting the tool carrier, to adjust the position of the tool axis according to the pitch of the propeller blank.

14. A propeller milling and grinding machine as defined in claim 8, and comprising a tracer carriage moving parallel with the direction of movement of the tool carrier, and an axis mounted on said carriage in the direction of movement thereof and pivotally carrying the tracer.

15. A propeller milling and grinding machine as defined in claim 9, comprising a tracer carriage adapted to move parallel with the direction of movement of said feed carriage supporting the tool carrier, an axis mounted on said tracer carriage in the direction of movement thereof and pivotally carrying the tracer, and a variable ratio movement transmission operatively interconnecting said two carriages.

16. In a method for producing propellers and the like, the steps of machining the propeller blade by imparting to the blank a rotary to-and-fro motion about the axis of the blank in timed relation with a reciprocatory motion in the direction of the axis, imparting to the machining tool a radial movement along the blade face between the root and the tip of the blade, and varying the speed of the reciprocatory axial movement of the blank during progress of the radial movement of the tool to produce a propeller blade having a varying pitch between the root and the tip of the blade.

WERNER RISCH.

REFERENCES CITED

The following references are of record in the file of this patent:

UNITED STATES PATENTS

| Number | Name | Date |
|---|---|---|
| 1,784,972 | Newbrough | Dec. 16, 1930 |
| 2,085,016 | Ferguson | June 29, 1937 |
| 2,239,927 | Morton | Apr. 29, 1941 |
| 2,303,529 | Eley | Dec. 1, 1942 |
| 2,318,865 | Johnson | May 11, 1943 |

FOREIGN PATENTS

| Number | Country | Date |
|---|---|---|
| 537,543 | Great Britain | June 26, 1941 |